(12) United States Patent
Takehara

(10) Patent No.: US 9,903,127 B2
(45) Date of Patent: Feb. 27, 2018

(54) FUNERAL INSTITUTION AND FUNERAL ATTENDANCE ASSISTING METHOD

(71) Applicant: D&A Consulting Ltd., Nagano (JP)

(72) Inventor: Kenji Takehara, Nagano (JP)

(73) Assignee: D&A Consulting Ltd., Nagano (JP)

( * ) Notice: Subject to any disclaimer, the term of this patent is extended or adjusted under 35 U.S.C. 154(b) by 0 days.

(21) Appl. No.: 15/534,198

(22) PCT Filed: Nov. 18, 2015

(86) PCT No.: PCT/JP2015/082398
§ 371 (c)(1),
(2) Date: Jun. 8, 2017

(87) PCT Pub. No.: WO2016/093029
PCT Pub. Date: Jun. 16, 2016

(65) Prior Publication Data
US 2017/0328076 A1   Nov. 16, 2017

(30) Foreign Application Priority Data

Dec. 9, 2014   (JP) .................................. 2014-249188

(51) Int. Cl.
*E04H 3/26* (2006.01)
*E04H 3/10* (2006.01)
(Continued)

(52) U.S. Cl.
CPC .............. *E04H 3/10* (2013.01); *E04H 14/00* (2013.01); *G06Q 10/06* (2013.01); *G06Q 30/06* (2013.01); *G06Q 50/10* (2013.01)

(58) Field of Classification Search
CPC .......... E04H 3/10; E04H 14/00; G06Q 10/06; G06Q 30/06; G06Q 50/10
(Continued)

(56) References Cited

U.S. PATENT DOCUMENTS

| 5,655,671 A * | 8/1997 | Barry .................. A47F 5/02 |
| | | 211/163 |
| 9,652,761 B2 * | 5/2017 | Smith .................. G06Q 20/102 |

(Continued)

FOREIGN PATENT DOCUMENTS

| JP | 11062289 A2 | 3/1999 |
| JP | 2003157327 A2 | 5/2003 |

(Continued)

OTHER PUBLICATIONS

"Drive-Thru Casket Viewings are Now an Acutal Trend" by Laura Stampler dated Oct. 17, 2014 found at: http://time.com/3517280/drive-thru-casket-viewings-funeral-home/.*

(Continued)

*Primary Examiner* — Brian D Mattei
(74) *Attorney, Agent, or Firm* — Rankin, Hill & Clark LLP

(57) ABSTRACT

A funeral institution includes an entrance connected to an approach way of a vehicle, an exit connected to an exit path of the vehicle, a roadway of the vehicle, a vehicle mourner reception device, car stop lifts, and incense-burner stands. The roadway is placed along front-side wall surfaces of ceremonial halls and connects the entrance and the exit. The vehicle mourner reception device is placed on a right side in a direction of travel on the roadway so as to be closer to the entrance than to the ceremonial hall. The car stop lifts fix the vehicles in predetermined areas, respectively. The predetermined areas and are areas in which altars and screens can be seen in front of the ceremonial halls on the roadway. The incense-burner stands are placed on the right sides of the predetermined areas, respectively, in the direction of travel.

2 Claims, 2 Drawing Sheets

(51) Int. Cl.
 *G06Q 50/10* (2012.01)
 *G06Q 10/06* (2012.01)
 *G06Q 30/06* (2012.01)
 *E04H 14/00* (2006.01)

(58) Field of Classification Search
 USPC .................................................................. 52/7
 See application file for complete search history.

(56) References Cited

U.S. PATENT DOCUMENTS

| | | | | |
|---|---|---|---|---|
| 2003/0217120 | A1* | 11/2003 | Hickey | H04L 29/06 709/219 |
| 2008/0072406 | A1* | 3/2008 | Sinclair | G06Q 30/02 27/1 |
| 2014/0314480 | A1* | 10/2014 | Heald | E01F 13/048 404/6 |
| 2015/0050084 | A1* | 2/2015 | Berto | E01F 13/046 404/6 |

FOREIGN PATENT DOCUMENTS

| | | |
|---|---|---|
| JP | 2012241494 A2 | 12/2012 |
| WO | 2014118964 A1 | 8/2014 |

OTHER PUBLICATIONS

Ono, 'Kore ga Sogi Saizensen? Drive-through de Sanretsu dekiru Saijo ga Tojo', Garakuta Gallery [online], Oct. 19, 2014 (Oct. 19, 2014) [retrieval date Feb. 6, 2015 (Feb. 6, 2015)], Internet: URL: <http://garakuta.oops. jp/wordpress/?p=7066>; Cited in ISR & JPOA.

Kuruma Shakai mo Kokomade, Window Goshi ni Kojin to Taimen dekiru Drive-through Saijo ga Kohyo, Gigazine [online], Apr. 20, 2011 (Apr. 20, 2011) [retrieval date Feb. 6, 2015 (Feb. 6, 2015)], Internet: <URL:http://gigazine.net/news/20110420_drive_thru_funeral_parlour/>; Cited in ISR.

1st & Sole Office Action dated Feb. 24, 2015 for the corresponding Japanese Patent Application No. 2014-249188.

International Search Report dated Jan. 19, 2016 filed in PCT/JP2015/082398.

* cited by examiner

FUNERAL INSTITUTION AND FUNERAL ATTENDANCE ASSISTING METHOD

TECHNICAL FIELD

The present invention relates to a funeral institution allowing a mourner to attend a funeral while the mourner is riding on a vehicle. The present invention particularly relates to a funeral institution and a funeral attendance assisting method, each of which allows mourners in various circumstances to casually attend a funeral.

BACKGROUND ART

Conventionally, for example, a technique disclosed in Patent Literature 1 has been known as a funeral institution.

In a funeral hall disclosed in Patent Literature 1, a stage and an altar are placed in a forward inner part of the hall. A back side partition curtain and a side partition curtain are provided on the side and the backside of the altar. Further, a mizuhiki curtain for hiding a gap between a ceiling of the hall and the back side partition curtain is hung above the altar. A moving unit is provided below the stage. The moving unit integrally moves the stage, the altar, the back side partition curtain, the side partition curtain, and the mizuhiki curtain in a forward and backward direction of the hall. Further, a stretchable yokokakushi curtain for hiding a gap between a side wall of the hall and the side partition curtain is provided on the side of the side partition curtain.

CITATION LIST

Patent Literature

Patent Literature 1: JP-A-11-62289

SUMMARY OF INVENTION

Problems to be Solved by the Invention

In the technique disclosed in Patent Literature 1, it is possible to set a hall in accordance with the number of mourners ([0030] in the same literature). However, in the first place, it is impossible to meet a demand that a physically disabled person or the whole family attend a funeral, a demand to attend a funeral after hours, e.g., at night, and a demand to attend a funeral in ordinary clothes for a short time because of busyness.

In view of this, the present invention has been made in view of an unsolved problem that such a conventional technique has. An object of the present invention is to provide a funeral institution and a funeral attendance assisting method, each of which allows mourners in various circumstances to casually attend a funeral.

Solutions to the Problems

[Invention 1] In order to achieve the above object, a funeral institution in Invention 1, which allows a mourner to attend a funeral while the mourner is riding on a vehicle, includes: an entrance connected to an approach way of the vehicle; an exit connected to an exit path of the vehicle; a roadway of the vehicle placed along an altar part in front of the altar part and connecting the entrance and the exit; a mourner reception device placed on the roadway at the side of the entrance than the alter part, or in the vicinity of the entrance and configured to receive signing in of the mourner who rides on the vehicle; a vehicle fixing unit that fixes the vehicle in a predetermined area on the roadway in which the altar part can be seen; and an incense-burner stand placed in the predetermined area or in the vicinity of the predetermined area.

With this configuration, a mourner enters the entrance through the approach way by a vehicle while riding on the vehicle and signs in by using the mourner reception device. Thereafter, when the mourner moves the vehicle to the predetermined area along the roadway, the vehicle is fixed in the predetermined area by the vehicle fixing unit. In the predetermined area, the altar part can be seen. Therefore, the mourner can see the altar part herein while riding on the vehicle. Further, the incense-burner stand is placed in the predetermined area or in the vicinity thereof. Therefore, the mourner can offer incense herein while riding on the vehicle. When those processes are completed, the mourner leaves by the vehicle toward the exit path via the exit.

Herein, the altar part includes not only an altar itself but also a display unit that displays a photograph of deceased person or the altar. The display unit only needs to display the photograph of deceased person or the altar by an electronical, fixed, or other methods. This encompasses, for example, a display, a projector, a poster, and a signboard.

[Invention 2] Further, a funeral institution in Invention 2 in the funeral institution in Invention 1 includes an offered good joint purchase system that allows the plurality of mourners to make a joint purchase of a single offered good for a funeral. The offered good joint purchase system includes an offered good information storage unit display stores offered good information including a price of the offered good, a payment-money-amount input unit that allows the mourners to input amounts of payable money, a price determination unit that determines, regarding the single offered good, whether or not a sum total of the amounts of money input to the payment-money-amount input unit by the plurality of mourners is equal to or greater than the price of the offered good on the basis of the offered good information of the offered good information storage unit, and an offered good ordering unit that orders the offered good on the basis of the offered good information of the offered good information storage unit in a case where the price determination unit determines that the sum total is equal to or greater than the price of the offered good.

With this configuration, a mourner inputs an amount of money payable for a single offered good by using the payment-money-amount input unit. When amounts of payable money are input by a plurality of mourners, the price determination unit determines, regarding the single offered good, whether or not a sum total of the amounts of money input by the plurality of mourners is equal to or greater than a price of the offered good on the basis of offered good information of the offered good information storage unit. As a result, in a case where it is determined that the sum total thereof is equal to or greater than the price of the offered good, the offered good ordering unit orders the offered good on the basis of the offered good information of the offered good information storage unit.

Herein, the offered good information storage unit stores offered good information by various types of units and at various timings. The offered good information storage unit may store offered good information in advance. Alternatively, at the time of operating the offered good joint purchase system, the offered good information storage unit may store offered good information that is, for example, input from the outside, instead of storing offered good information in advance.

Further, the offered good joint purchase system may be realized as a single device, a single terminal, or another single apparatus, or a plurality of devices, a plurality of terminals, or other apparatuses may be realized as a network system that is communicably connected. In the latter case, each constituent element may belong to any one of the plurality of apparatuses or the like as long as each constituent element is communicably connected. Further, a part of or all the constituent elements may be configured to be assembled into another equipment such as the mourner reception device.

[Invention 3] Meanwhile, in order to achieve the above object, in a funeral attendance assisting method in Invention 3, which is a funeral attendance assisting method using any one of the funeral institutions in Inventions 1 and 2, includes: a mourner reception step in which the mourner reception device receives signing in of the mourner who rides on the vehicle; and a vehicle fixing step in which the vehicle fixing unit fixes, in the predetermined area, the vehicle of the mourner who completes signing in in the mourner reception step.

Effects of the Invention

As described above, according to the funeral institution in Invention 1 or 2, a mourner can attend a funeral while riding on a vehicle. Therefore, it is possible to meet a demand that a physically disabled person or the whole family attend a funeral, a demand to attend a funeral after hours, e.g., at night, a demand to attend a funeral in ordinary clothes for a short time because of busyness, and the like. Therefore, mourners in various circumstances can casually attend a funeral than before.

Furthermore, according to the funeral institution in Invention 2, a plurality of mourners can make a joint purchase of a single offered good. Therefore, a mourner who cannot purchase a single offered good by himself/herself because a financial burden is too large can take an opportunity to offer a good.

DESCRIPTION OF EMBODIMENTS

Figure 1:
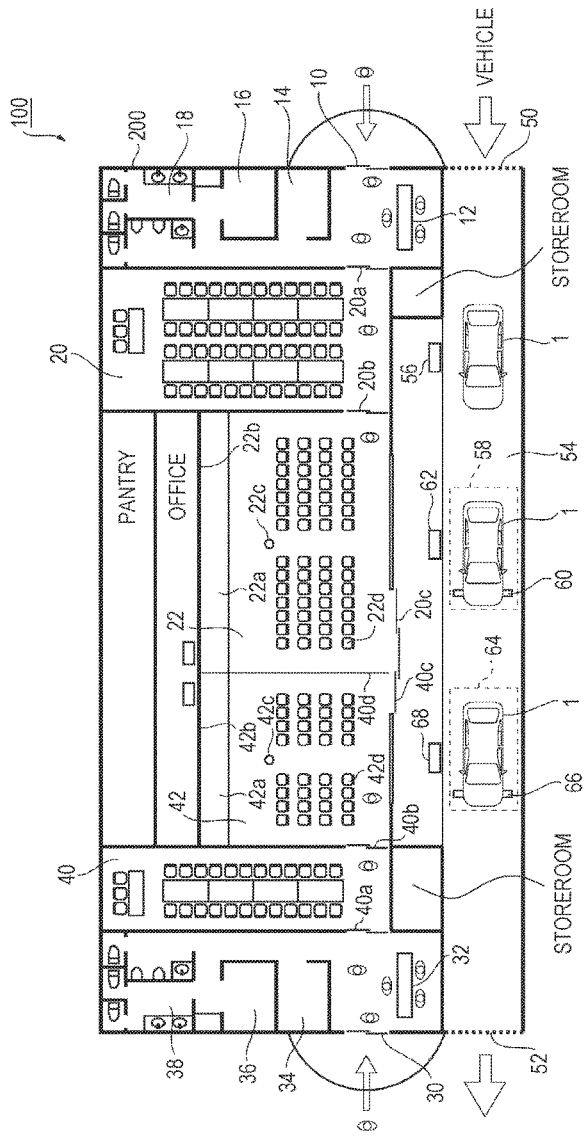
FIG. 1 is a plan view of a funeral institution 100.
Figure 2:
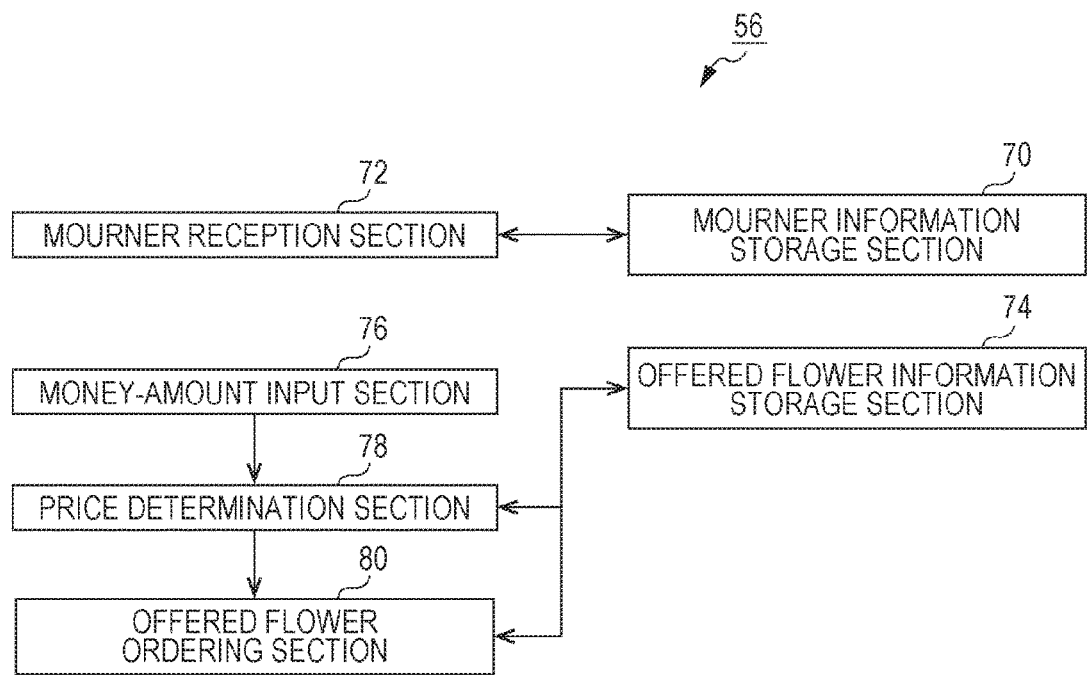
FIG. 2 is a functional block diagram of a vehicle mourner reception device 56.

Hereinafter, an embodiment of the present invention will be described. FIG. 1 and FIG. 2 are diagrams showing this embodiment.

First, a configuration of this embodiment will be described.

FIG. 1 is a plan view of a funeral institution 100. Note that, in the following description, description will be made by setting an upward direction in FIG. 1 is a depth direction and a downward direction in FIG. 1 is a frontward direction.

As shown in FIG. 1, the funeral institution 100 is configured to include a building 200 serving as a funeral hall.

In the building 200, two halls for holding different funerals are placed. Each hall is configured to be used by a mourner who comes on foot as conventional (hereinafter, referred to as "walking mourner") and a mourner who comes by a vehicle 1 (hereinafter, referred to as "vehicle mourner").

The first hall is configured to include an entrance 10 placed on a right side of the building 200, a reception 12 for receiving signing in of a walking mourner, an officiating monk waiting room 14, a relative waiting room 16, restrooms 18, a purifying room 20 used by a walking mourner, and a ceremonial hall 22.

The reception 12 is placed in a left area in the entrance 10.

The officiating monk waiting room 14 is placed in an inner area of the entrance 10. The relative waiting room 16 is placed in an inner area adjacent to the officiating monk waiting room 14. The two restrooms 18 are placed side by side in an inner area of the relative waiting room 16.

The purifying room 20 is placed in a left area of the reception 12 via a sliding door 20a.

The ceremonial hall 22 is placed in a left area of the purifying room 20 via a sliding door 20b. A walking mourner can enter the ceremonial hall 22 via the sliding door 20b. A vehicle mourner can enter the ceremonial hall 22 via a sliding door 20c placed in an inner side of the ceremonial hall 22.

The ceremonial hall 22 is configured to include an altar 22a placed in the inner side, a screen 22b placed on an inner-side wall surface of the ceremonial hall 22, a camera 22c placed in front of the altar 22a, and a plurality of chairs 22d placed in front of the altar 22a. A large image of the altar 22a captured by the camera 22c is displayed on the screen 22b. The whole surface of a front-side wall surface of the ceremonial hall 22 is covered with transparent glass. The vehicle mourner can see the altar 22a and the screen 22b while riding on the vehicle 1 from the outside of the ceremonial hall 22.

A second hall is configured to include an entrance 30 placed on a left side of the building 200, a reception 32 for receiving signing in of a walking mourner, an officiating monk waiting room 34, a relative waiting room 36, restrooms 38, a purifying room 40 used by a walking mourner, and a ceremonial hall 42.

The reception 32 is placed in a right area in the entrance 30.

The officiating monk waiting room 34 is placed in an inner area of the entrance 30. The relative waiting room 36 is placed in an inner area adjacent to the officiating monk waiting room 34. The two restrooms 38 are placed side by side in an inner area of the relative waiting room 36.

The purifying room 40 is placed in a right area of the reception 32 via a sliding door 40a.

The ceremonial hall 42 is placed in a right area of the purifying room 40 via a sliding door 40b so as to be adjacent to the ceremonial hall 22. The ceremonial hall 22 and the ceremonial hall 24 are partitioned by a movable partition 40d. A walking mourner can enter the ceremonial hall 42 via the sliding door 40b. A vehicle mourner can enter the ceremonial hall 42 via a sliding door 40c placed in an inner side of the ceremonial hall 42.

The ceremonial hall 42 is configured to include an altar 42a placed in the inner side, a screen 42b placed in an inner-side wall surface of the ceremonial hall 42, a camera 42c placed in front of the altar 42a, and a plurality of chairs 42d placed in front of the altar 42a. A large image of the altar 42a captured by the camera 42c is displayed on the screen 42b. The whole surface of a front-side wall surface of the ceremonial hall 42 is covered with transparent glass. The vehicle mourner can see the altar 42a and the screen 42b while riding on the vehicle 1 from the outside of the ceremonial hall 42.

Next, equipment for allowing a vehicle mourner to attend a funeral while the vehicle mourner is riding on the vehicle 1 will be described.

As shown in FIG. 1, the funeral institution 100 is configured to include an entrance 50 connected to an approach way of the vehicle 1, an exit 52 connected to an exit path of the vehicle 1, a roadway 54 of the vehicle, and a vehicle mourner reception device 56. The roadway 54 is placed along the front-side wall surface of the ceremonial halls 22 and 42 and connects the entrance 50 and the exit 52. The vehicle mourner reception device 56 is placed on a right side in a direction of travel on the roadway 54 so as to be closer to the entrance 50 than to the ceremonial hall 22 and receives signing in of a vehicle mourner.

The funeral institution 100 is configured to further include a car stop lift 60, an incense-burner stand 62, a car stop lift 66, and an incense-burner stand 68. The car stop lift 60 fixes the vehicle 1 in a predetermined area 58. The area 58 is an area in which the altar 22a and the screen 22b can be seen in front of the ceremonial hall 22 on the roadway 54. The incense-burner stand 62 is placed on a right side of the predetermined area 58 in the direction of travel. The car stop lift 66 fixes the vehicle 1 in a predetermined area 64. The area 64 is an area in which the altar 42a and the screen 42b can be seen in front of the ceremonial hall 42 on the roadway 54. The incense-burner stand 68 is placed on a right side of the predetermined area 64 in the direction of travel.

The vehicle mourner reception device 56 can easily sign in by operating a touchscreen from the inside of the vehicle 1 through a window. It is possible to sign in without getting off the vehicle 1, which is safe and reduces time. A name of a vehicle mourner is displayed on the screen 22b or 42b placed in the ceremonial hall 22 or 42 simultaneously in conjunction with signing in using the vehicle mourner reception device 56. The name of the vehicle mourner is immediately known by a bereaved family and relatives even in a case where the vehicle mourner is far away therefrom. Therefore, greetings are instantly exchanged via the screen 22b or 42b. This also communicates a sense of trust as a matter of courtesy.

According to the vehicle mourner reception device 56, a plurality of vehicle mourners can also make a joint purchase of a single set of offered flowers for a funeral. It is possible to check, via a telephone or an e-mail, how many vacant spaces for flowers are in a single basket of arranged flowers and which kind of offered flower is in stock by using a program. Flower offering can be implemented by adding the kind and amount (even small amount) of offered flowers from an order of a single person. It is possible to maintain utilization and a sense of values of an orderer's favorite flower as a fresh flower without waste.

The incense-burner stands 62 and 68 can be set at positions within arm's reach when a window of the vehicle 1 is opened and incense can be offered. Therefore, all members of the whole family can easily offer incense at a time.

Regarding the car stop lifts 60 and 66, when a mourner signs in while riding on the vehicle 1 and the vehicle 1 enters via the entrance 50, a clerk in charge pushes a switch button, and, when the vehicle 1 comes to the predetermined area 58 or 64, an exclusive hydraulic jack is automatically raised from the ground, and the vehicle 1 is fixed in the predetermined area 58 or 64. When the vehicle mourner completes incense offering, the clerk in charge pushes the switch button, and the hydraulic jack is lowered into the ground. Therefore, the vehicle 1 can move to the exit 52. By repeating those processes, incense offering is performed one by one.

Using a letter font and color on the screens 22b and 42b so that a characteristic and position of the funeral institution 100 can be understood, a feature of the funeral institution 100, and the like are utilized by using both a vehicle driving in and stopping method and an attending method, and therefore it is possible to hold a favorable funeral that can be used by various people.

Next, a configuration of the vehicle mourner reception device 56 will be described.

FIG. 2 is a functional block diagram of the vehicle mourner reception device 56.

As shown in FIG. 2, the vehicle mourner reception device 56 is configured to include a mourner information storage section 70 and a mourner reception section 72. The mourner information storage section 70 stores mourner information on a vehicle mourner so that the mourner information is associated with chief mourner information on a chief mourner (for example, bereaved family) and ceremonial hall information on a ceremonial hall. The mourner reception section 72 receives signing in of the vehicle mourner on the basis of the mourner information of the mourner information storage section 70.

The mourner reception section 72 displays information on the chief mourner and the ceremonial hall on the touchscreen in response to a request from the vehicle mourner. When the vehicle mourner inputs his/her name or the like via the touchscreen, the mourner reception section 72 compares the input name with a name in a mourner name list on the basis of the mourner information of the mourner information storage section 70. In a case where the input name matches a mourner in the mourner name list, the mourner reception section 72 displays, on the touchscreen, guidance to one of the predetermined areas 58 and 64 corresponding to the ceremonial hall 22 or 42. Further, the mourner reception section 72 records attendance of the vehicle mourner on a ceremony visitor name file of the mourner information storage section 70 on the basis of the input name.

The mourner reception section 72 is communicably connected to a sensor for detecting that the vehicle 1 enters the predetermined area 58 or 64 and stops. The mourner reception section 72 controls the car stop lift 60 or 66 so that the vehicle 1 is fixed in one of the predetermined areas 58 and 64 corresponding to the ceremonial hall 22 or 42 on the basis of a detection result of the sensor.

The vehicle mourner reception device 56 is configured to further include an offered flower information storage section 74, a payment-money-amount input section 76, a price determination section 78, and an offered flower ordering section 80. The offered flower information storage section 74 stores offered flower information including the kind, an amount, and a price of offered flowers. A vehicle mourner inputs a payable amount of money to the payment-money-amount input section 76. Regarding a single set of offered flowers, the price determination section 78 determines whether or not a sum total of amounts of money input by a plurality of vehicle mourners to the payment-money-amount input section 76 is equal to or greater than a price of the offered flowers on the basis of the offered flower information of the offered flower information storage section 74. In a case where the price determination section 78 determines that the sum total thereof is equal to or greater than the price of the offered flowers, the offered flower ordering section 80 orders the offered flowers on the basis of the offered flower information of the offered flower information storage section 74.

The payment-money-amount input section 76 displays information on the kind and a stock amount of the offered flowers on the touchscreen on the basis of the offered flower information of the offered flower information storage section 74. The vehicle mourner selects a desired offered flower on the touchscreen and inputs a payable amount of money via the touchscreen.

The offered flower ordering section 80 records order information on an order of offered flowers on an order file of the offered flower information storage section 74. The offered flower ordering section 80 requests an offered flower order system connected via a network to order offered flowers.

Next, an implementation method in this embodiment will be described.

A vehicle mourner enters the entrance 50 by vehicle 1 from the approach way while riding on the vehicle 1 and signs in by using the vehicle mourner reception device 56. At this time, the vehicle mourner inputs a payable amount of money regarding a single set of offered flowers by using the payment-money-amount input section 76. When payable amounts of money are input by a plurality of vehicle mourners, the price determination section 78 determines, regarding the single set of offered flowers, whether or not a sum total of amounts of money input by the plurality of vehicle mourners is equal to or greater than a price of the offered flowers on the basis of the offered flower information of the offered flower information storage section 74. As a result, in a case where it is determined that the sum total thereof is equal to or greater than the price of the offered flowers, the offered flower ordering section 80 orders the offered flowers on the basis of the offered flower information of the offered flower information storage section 74.

Thereafter, when the vehicle mourner moves the vehicle 1 to the predetermined area 58 or 64 along the roadway 54 in accordance with guidance on the touchscreen of the vehicle mourner reception device 56, the vehicle 1 is fixed in the predetermined area 58 or 64 by the car stop lift 60 or 66. In the predetermined area 58 or 64, it is possible to see the altar 22a or 42a and the screen 22b or 42b. Therefore, the vehicle mourner can see the altar 22a or 42a and the screen 22b or 42b herein while riding on the vehicle 1. Further, the incense-burner stand 62 or 68 is placed on the right side of the predetermined area 58 or 64 in the direction of travel. Therefore, the vehicle mourner can offer incense herein while riding on the vehicle 1. When those processes are completed, the vehicle mourner leaves by the vehicle 1 toward the exit path via the exit 52.

Next, effects of this embodiment will be described.

In this embodiment, the funeral institution 100 includes the roadway 54, the vehicle mourner reception device 56, the car stop lifts 60 and 66, and the incense-burner stands 62 and 68. The roadway 54 is placed along the front-side wall surfaces of the ceremonial halls 22 and 42. The vehicle mourner reception device 56 is placed on the right side in the direction of travel on the roadway 54 so as to be closer to the entrance 50 than to the ceremonial hall 22. The car stop lifts 60 and 66 fix the vehicles 1 in the predetermined areas 58 and 64, respectively. The predetermined areas 58 and 64 are areas in which the altars 22a and 42a and the screens 22b and 42b can be seen in front of the ceremonial halls 22 and 42 on the roadway 54. The incense-burner stands 62 and 68 are placed on the right sides of the predetermined areas 58 and 64, respectively, in the direction of travel.

With this, a vehicle mourner can attend a funeral while riding on the vehicle 1. Therefore, it is possible to meet a demand that a physically disabled person or the whole family attend a funeral, a demand to attend a funeral after hours, e.g., at night, a demand to attend a funeral in ordinary clothes for a short time because of busyness, and the like. Therefore, mourners in various circumstances can casually attend a funeral than before.

Further, in this embodiment, the vehicle mourner reception device 56 includes the offered flower information storage section 74, the payment-money-amount input section 76, the price determination section 78, and the offered flower ordering section 80. The offered flower information storage section 74 stores offered flower information including a price of an offered flower. A vehicle mourner inputs a payable amount of money to the payment-money-amount input section 76. The price determination section 78 determines, regarding a single set of offered flowers, whether or not a sum total of amounts of money input to the payment-money-amount input section 76 by a plurality of vehicle mourners is equal to or greater than a price of the offered flowers on the basis of the offered flower information of the offered flower information storage section 74. In a case where the price determination section 78 determines that the sum total thereof is equal to or greater than the price of the offered flowers, the offered flower ordering section 80 orders the offered flowers on the basis of the offered flower information of the offered flower information storage section 74.

With this, the plurality of vehicle mourners can make a joint purchase of a single set of offered flowers. Therefore, a vehicle mourner who cannot purchase a single set of offered flowers by himself/herself because a financial burden is too large can take an opportunity to offer flowers.

In addition, the funeral institution 100 according to this embodiment can also have the following effects.

(1) Because a large number of people attend a funeral, it is possible to realize bright sending off and creation of a glorious stage.

(2) A substitute can attend a funeral for reasons of a mourner's own, and therefore it is possible to maintain trust thereafter.

(3) The whole hall can be compact and a funeral can be held in consideration of a line of a funeral hall installation place.

(4) It is possible to easily hold a funeral also in view of a life improvement concept (reduction in the whole expenses).

(5) Regarding simplification of, for example, kouden (condolence money), concern, and the like, it is possible to relieve a financial anxiety, and there is no hesitation (no return gift).

(6) Regarding offered flowers or the like, each person can offer a small amount of flowers, and therefore it is possible to maintain equality.

(7) A purifying ceremony is held with light catering and beverages in a hall or the like, which is easy.

(8) Although a kouden is unavoidably received from a mourner in some cases, it is possible to understand a way of thinking about the whole method.

(9) It is possible to easily sign in from the inside of the vehicle 1 by using the vehicle mourner reception device 56.

(10) All members can offer incense in the vehicle 1 at a time by using the incense-burner stands 62 and 68.

(11) The car stop lifts 60 and 66 are automatically moved upward from the ground and downward into the ground and can therefore stop vehicles.

(12) It is possible to immediately understand a position of a facility even at night because of the screens 22b and 42b.

(13) When an advertisement image exterior panel is placed, a characteristic of the facility is exhibited, which is favorable for business.

(14) It is possible to perform general instructions on arrangement and usability of each piece of equipment in the building 200, a performance ability, and the like.

(15) It is possible to perform instructions on a structure of the roadway 54 in the building 200 and the use of, practicality of, and a safety measure for the equipment.

(16) It is possible to perform instructions on a traffic safety measure, such as placement of an exterior structure, arrangement of a parking space, and a guide path.

(17) It is possible to perform instructions on a countermeasure against the whole neighborhood, a conference with various government offices, reduction in a construction cost and making a budget thereof.

In this embodiment, the offered flower information corresponds to the offered good information in Invention 2. The altars 22*a* and 42*a* and the screens 22*b* and 42*b* correspond to the altar part in Invention 1. The vehicle mourner reception device 56 corresponds to the mourner reception device in Invention 1 or 3 or the offered good joint purchase system in Invention 2. Further, the car stop lifts 60 and 66 correspond to the vehicle fixing unit in Invention 1 or 3. The offered flower information storage section 74 corresponds to the offered good information storage unit in Invention 2. The payment-money-amount input section 76 corresponds to the payment-money-amount input unit in Invention 2. The price determination section 78 corresponds to the price determination unit in Invention 2.

Further, in this embodiment, the offered flower ordering section 80 corresponds to the offered good ordering unit in Invention 2.

Another Modification Example

Note that, in the above embodiment, a case of purchasing offered flowers serving as a target of a joint purchase has been described. However, the present invention is not limited thereto, and it is also possible to set an offered good other than offered flowers as a target of a joint purchase. A plurality of kinds of offered goods can also be dealt with.

Further, in the above embodiment and the modification example thereof, the vehicle mourner reception device 56 has a reception function and a joint purchase function. However, the present invention is not limited thereto, and the vehicle mourner reception device 56 can also be configured to have only the reception function. In this case, the joint purchase function can be configured to be incorporated into a device other than the vehicle mourner reception device 56. When the device is placed in the vicinity of the receptions 12 and 32, not only a vehicle mourner but also a walking mourner can use a joint purchase.

DESCRIPTION OF REFERENCE SIGNS

100: funeral institution
200: building
1: vehicle
10, 30, 50: entrance
12, 32: reception
14, 34: officiating monk waiting room
16, 36: relative waiting room
18, 38: restroom
20, 40: purifying room
22, 42: ceremonial hall
20*a*, 20*b*, 20*c*, 40*a*, 40*b*, 40*c*: sliding door
22*a*, 42*a*: altar
22*b*, 42*b*: screen
22*c*, 42*c*: camera
22*d*, 42*d*: chair
40*d*: movable partition
52: exit
54: roadway
56: vehicle mourner reception device
58, 64: predetermined area
60, 66: car stop lift
62, 68: incense-burner stand
70: mourner information storage section
72: mourner reception section
74: offered flower information storage section
76: payment-money-amount input section
78: price determination section
80: offered flower ordering section

The invention claimed is:

1. A funeral institution, which allows a mourner to attend a funeral while the mourner is riding in a vehicle, comprising:

an entrance connected to an approach way of the vehicle;
an exit connected to an exit path of the vehicle;
a roadway of the vehicle placed along an altar part in front of the altar part and connecting the entrance and the exit;
a mourner reception device placed on the roadway at the other side of the entrance than the alter part, or in the vicinity of the entrance and configured to receive signing in of the mourner who rides in the vehicle;
a vehicle fixing unit that fixes the vehicle in a predetermined area on the roadway in which the altar part can be seen;
an incense-burner stand placed in the predetermined area or in the vicinity of the predetermined area; and
an offered good joint purchase system that allows a plurality of mourners to make a joint purchase of a single offered good for a funeral, wherein
the offered good joint purchase system includes
an offered good information storage unit that stores offered good information including a price of the offered good,
a payment-money-amount input unit that allows the mourners to input amounts of payable money,
a price determination unit that determines, regarding the single offered good, whether or not a sum total of the amounts of money input to the payment-money-amount input unit by the plurality of mourners is equal to or greater than the price of the offered good on the basis of the offered good information of the offered good information storage unit, and
an offered good ordering unit that orders the offered good on the basis of the offered good information of the offered good information storage unit in a case where the price determination unit determines that the sum total is equal to or greater than the price of the offered good.

2. A funeral attendance assisting method using the funeral institution according to claim 1, comprising:

a mourner reception step in which the mourner reception device receives signing in of the mourner who rides in the vehicle;
a vehicle fixing step in which the vehicle fixing unit fixes, in the predetermined area, the vehicle of the mourner who completes signing in in the mourner reception step;
a payment-money-amount input step in which the mourner inputs an amount of payable money to the payment-money-amount input unit;

a price determination step in which, regarding the single offered good, the price determination unit determines whether or not a sum total of amounts of money input by the plurality of mourners in the payment-money-amount input step is equal to or greater than a price of the offered good on the basis of the offered good information of the offered good information storage unit; and an offered good order step in which the offered good ordering unit orders the offered good on the basis of the offered good information of the offered good information storage unit in a case where it is determined that the sum total is equal to or greater than the price of the offered good in the price determination step.

* * * * *